United States Patent [19]

Nesbit et al.

[11] Patent Number: 4,864,646

[45] Date of Patent: Sep. 5, 1989

[54] NECKSTRAP

[76] Inventors: Mark S. Nesbit; Candy K. Galvanek, both of 1248 - 17th, West Des Moines, Iowa 50265

[21] Appl. No.: 199,446

[22] Filed: May 27, 1988

[51] Int. Cl.[4] ............................................. H04B 1/06
[52] U.S. Cl. .................................... 455/344; 455/351
[58] Field of Search ............... 455/350, 349, 344, 351; 381/87, 88, 74; 354/76

[56] References Cited

U.S. PATENT DOCUMENTS

| | | | |
|---|---|---|---|
| 2,899,879 | 8/1959 | Lopez | 95/11 |
| 2,899,881 | 8/1959 | Lopez | 95/12 |
| 2,913,971 | 11/1959 | Berkovits | 95/12 |
| 3,165,991 | 1/1965 | Yoshida | 95/12 |
| 3,246,587 | 4/1966 | Oliver, Jr. | 95/12 |
| 3,761,815 | 9/1973 | Bower | 325/16 |
| 3,792,486 | 2/1974 | Lange | 95/12 |
| 4,033,488 | 7/1977 | Brewer | 455/351 |
| 4,035,731 | 7/1977 | Dixon | 325/361 |
| 4,084,139 | 4/1978 | Jakobe | 455/351 |
| 4,252,428 | 2/1981 | Iwata et al. | 354/76 |
| 4,485,276 | 11/1984 | Sato | 179/157 |
| 4,539,700 | 9/1985 | Sato | 455/351 |
| 4,676,619 | 6/1987 | Woolley | 354/79 |

Primary Examiner—Robert L. Griffin
Assistant Examiner—Curtis Kuntz
Attorney, Agent, or Firm—Henderson & Sturm

[57] ABSTRACT

A neckstrap with a flat body section and having connectors secured to each end for attachment to a portable object such as a camera or binoculars. A speaker assembly is attached to the top side of the neckstrap and connects to an audio signal source housed in the neckstrap. A pouch is contained in the neckstrap for housing earphones for private listening of the audio signal source.

15 Claims, 2 Drawing Sheets

U.S. Patent    Sep. 5, 1989    Sheet 1 of 2    4,864,646
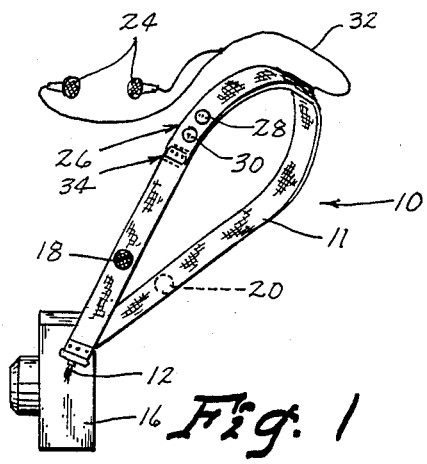
Fig. 1
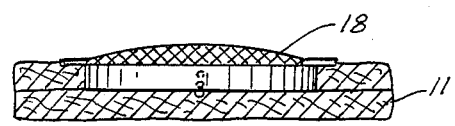
Fig. 3
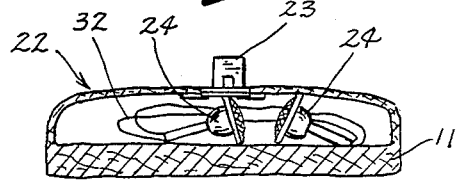
Fig. 5
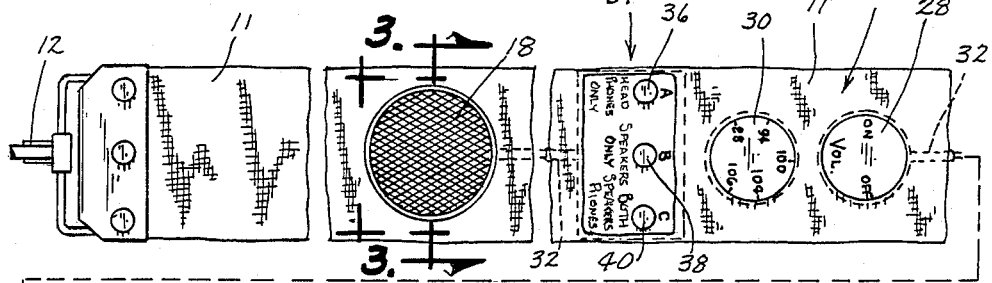
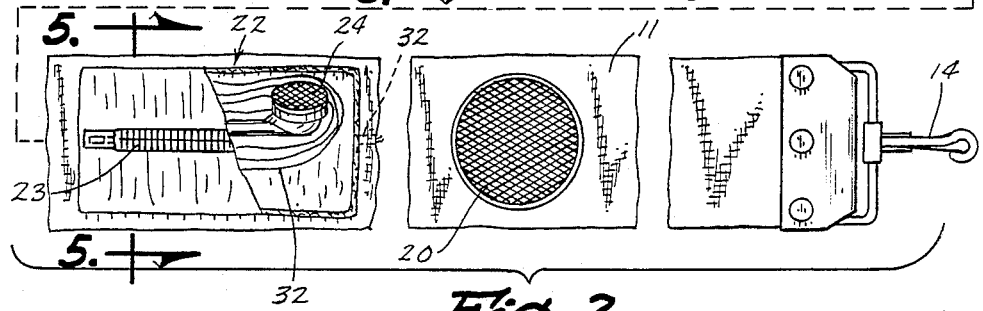
Fig. 2
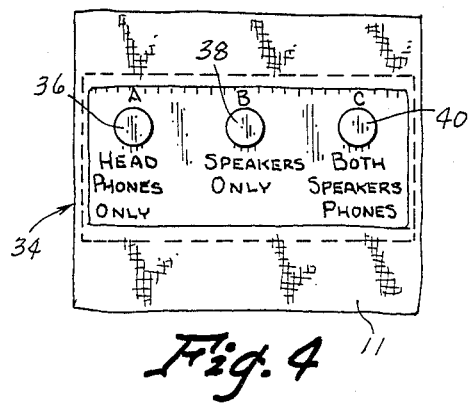
Fig. 4
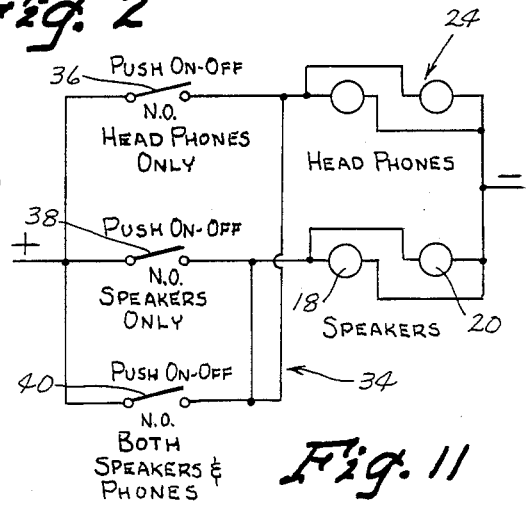
Fig. 11

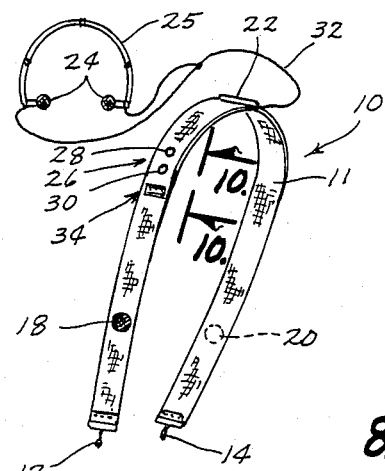
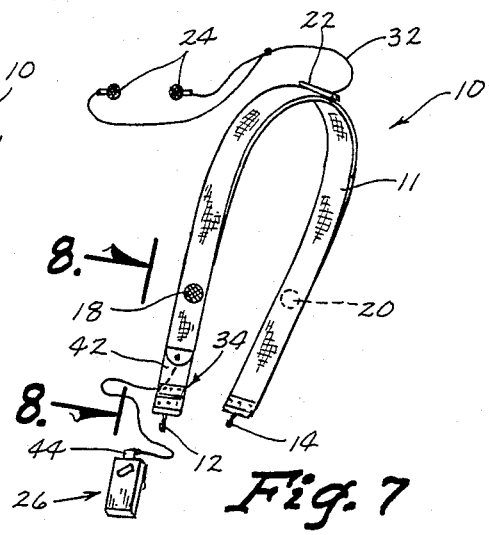
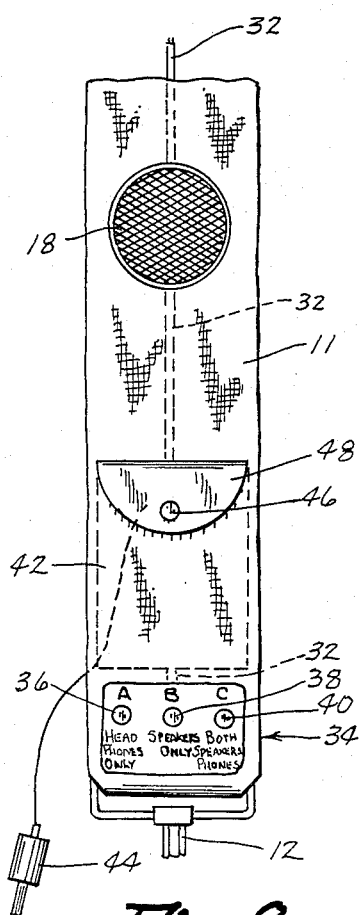
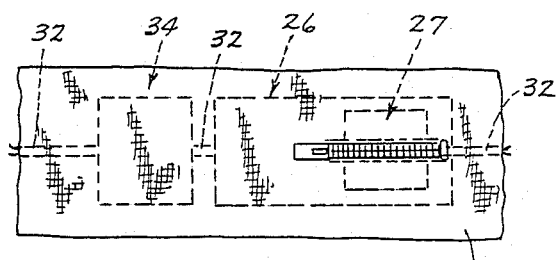
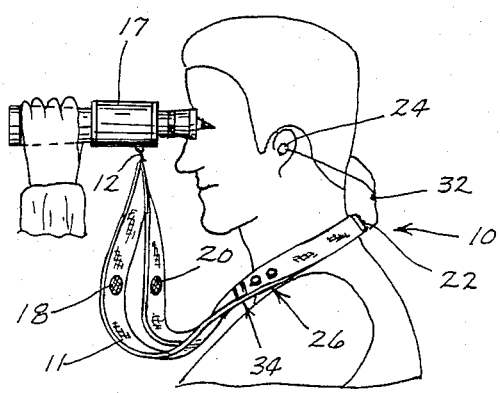

NECKSTRAP

TECHNICAL FIELD

This invention relates to neckstraps for attachment to a portable object, such as a camera or binoculars, and more particularly to a neckstrap housing an audio signal source.

BACKGROUND ART

There are many prior art devices that utilize a compartment for carrying a portable radio for use when away from a stationary set, but the speakers are built into the radio. Also the earphones for private listening are carried in one's pocket or purse and therefore easy to lose or misplace. Having a radio built into an object, such as a camera, is well known in the art, but the problem with this prior art is that the radio is a permanent part of the camera and the speaker system is inadequate. Also, if a person carries a camera by a neckstrap and still wants to have access to a radio, a radio must be carried somewhere on the person thereby creating clutter and confusion when trying to use the camera.

Those concerned with these and other problems recognize the need for an improved neckstrap capable of housing an audio signal source.

DISCLOSURE OF THE INVENTION

The present invention provides a neckstrap with a flat body section and having connectors secured to each end for attachment to a portable object such as a camera or binoculars. A speaker assembly is attached to the top side of the neckstrap and the speaker assembly connects to an audio signal source. The audio signal source, such as a radio, cassette tape player, or compact disc player may be housed in the neckstrap, or it may be independent from the neckstrap. A pouch is formed in the neckstrap for housing an earphone for private listening of the audio signal source.

An object of the present invention is the provision of an improved neckstrap housing an audio signal source.

Another object of the invention is to provide a neckstrap that allows the user to selectively choose private listening of the audio signal source or letting others listen also.

A further object of the invention is the provision of a neckstrap that contains a pouch for containment of the earphones.

Still another object is to provide a neckstrap that is inexpensive to manufacture and easy to use and maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the neckstrap of the present invention attached to a camera and the earphones shown outside of the zippered pouch;

FIG. 2 is a partial top plan view of the neckstrap showing placement of the speaker assemblies, the radio and the zippered pouch for containment of the earphones;

FIG. 3 is a sectional side elevational view of the speaker assembly taken along line 3—3 of FIG. 2;

FIG. 4 is a partial top plan view of the switching mechanism for selectively connecting the audio signal source to the speaker assemblies and the earphones;

FIG. 5 is a sectional side elevational view of the zippered pouch taken along line 5—5 of FIG. 2 showing the earphones contained therein;

FIG. 6 is a perspective view of the neckstrap with a collapsible headset extending from the zippered pouch;

FIG. 7 is an alternate embodiment of the neckstrap with a connector extending from a compartment on one end of the neckstrap for attaching to an audio signal source carried on the user;

FIG. 8 is a partial top plan view of the neckstrap showing the compartment for housing the connector;

FIG. 9 is a perspective view of the neckstrap attached to a pair of binoculars;

FIG. 10 is a partial bottom plan view taken along lines 10—10 of FIG. 6 showing the position of the switching mechanism, the audio signal source and the battery compartment in dashed lines, and showing the zippered closure in the bottomside of the neckstrap to provide access to the battery compartment; and FIG. 11 is a schematic diagram of the switching mechanism.

BEST MODE FOR CARRYING OUT THE INVENTION

Referring now to the drawings, wherein like reference numerals designate identical or corresponding parts throughout the several views, FIG. 1 shows the neckstrap generally at 10. The neckstrap (10) includes a flat body section (11) having connectors (12, 14) secured to each end for attachment to a camera (16) or the like. Attached to the neckstrap (10) by means of switching or gluing are speaker assemblies (18, 20). A pouch (22) is located midway between the ends of the neckstrap (10) on the top side thereof. The pouch (22) is selectively opened and closed by means of a zipper (23). Housed in the pouch (22) is an earphone (24) for listening to an audio signal source (26), such as a radio, cassette tape player, or compact disc player, contained in the neckstrap (10). FIG. 6 shows a collapsible headset (25) that, when folded, fits within the pouch (22).

Referring to FIG. 2, the audio signal source (26) is a thin profile FM radio having a volume control knob (28) and frequency selector (30) extending through the top side of the body section (11) of the neckstrap (10). As shown in FIG. 10, access to the battery compartment (27) of FM radio (26) is provided by a zippered closure (13) located on the bottomside of the body section (11). The zippered closure (13) includes a nylon zipper and an overlapping flap to prevent irritation of the user's skin. Connecting wires (32) electronically connect the speaker assemblies (18, 20) and earphones (24) to the audio signal source (26) through a switching mechanism (34).

FIGS. 4 and 11 show the configuration of the switching mechanism (34) that allows the user of the neckstrap (10) to activate push buttons (36, 38, 40) to select headphones only, speakers only, or both speakers and headphones.

FIG. 7 is an alternate embodiment of the neckstrap (10) wherein the audio signal source (26) is located on the user independent of the neckstrap (10). A compartment (42) is located on the end of the neckstrap (10) and houses the connector (44) to electronically couple the audio signal source (26) to the speaker assemblies (18, 20) and the earphones (24) carried on the neckstrap (10).

A snap member (46) is located on the flap (48) of the compartment (42) to keep the compartment (42) in a closed position to allow containment of the connector (44) when not in use.

In use, the neckstrap (10) is attached to a camera (16) or binoculars (17) by means of connectors (12, 14). The neckstrap (10) is then placed around the user's neck. The audio signal source (26) is positioned on the body section (11) of the neckstrap (10) between one end connector (12) and the pouch (22). This location minimizes movement of the audio signal source (26) when the user raises the camer (16) or binoculars (17) to eye level as illustrated in FIG. 9.

The zipper (23) of the pouch (22) is unzipped and the earphones (24) are removed from the pouch (22). The earphones (24) are placed into the user's ears and the user selects either headphones, speakers, or both by depressing the appropriate push button (36, 38, 40) of the switching mechanism (34). The audio signal source (26) is turned on by the volume control knob (28) and the desired frequency is dialed by use of the frequency selector (30).

By selecting the headphones only on the switching mechanism (34), the user can listen to music in private and not disturb others. By selecting the speakers only on the switching mechanism (34) the user can let others enjoy the sound coming from the audio signal source (26). By selecting both speakers and earphones on the switching mechanism (34), both components are utilized.

The embodiment of the neckstrap (10) shown in FIGS. 7 and 8 includes an audio signal source (26) that is independent from the neckstrap (10). The operation of the neckstrap is the same as described above, except that the connector (44) must be removed from the compartment (42) and inserted into the appropriate opening in the independent audio signal source (26) to electronically couple the audio signal source (26) to the speaker assemblies (18, 20) and the earphones (24).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A neckstrap having a top side and a bottom side, said neckstrap consisting of a single elongated flat body section having a top side and a bottom side and connectors secured to each end for attachment to a portable object such as a camera or binoculars, the improvement comprising:

a speaker assembly attached on the top side of the body section at a location spaced from each end of said neckstrap;

an earphone attached to said neckstrap;

a pouch formed in said neckstrap for containment of said earphone, said pouch being located on said top side of said neckstrap midway between each of said ends and being selectively openable and closable for removal and storage of said earphone; and;

means for selectively electronically connecting said speaker assembly and said earphone to an audio signal source.

2. The neckstrap of claim 1 wherein said speaker assembly is attached to said neckstrap by means of stitching.

3. The neckstrap of claim 1 wherein said speaker assembly is attached to said neckstrap by means of gluing.

4. The neckstrap of claim 1 wherein said means for electronically connecting said speaker assembly to an audio signal source includes conducting wires attached to said neckstrap.

5. The neckstrap of claim 1 wherein said means for electronically connecting said earphone to an audio signal source includes conducting wires attached to said neckstrap.

6. The neckstrap of claim 1 wherein said audio signal source is attached to said neckstrap.

7. The neckstrap of claim 6 wherein said audio signal source is positioned midway between said pouch and one end of said neckstrap.

8. The neckstrap of claim 1 wherein said pouch includes a zipper opening and closing mechanism.

9. The neckstrap of claim 1 wherein said audio signal source is separate from said neckstrap.

10. The neckstrap of claim 9 wherein said means for electronically connecting the audio signal source includes a connector disposed in a compartment formed in one end of said neckstrap, said compartment being selectively openable and closable for removal and storage of said connector.

11. The neckstrap of claim 10 wherein said compartment is selectively openable and closable by means of a snap member.

12. The neckstrap of claim 1 wherein said audio signal source is a radio.

13. The neckstrap of claim 1 wherein said audio signal source is a cassette tape player.

14. The neckstrap of claim 1 wherein said audio signal source is a compact disc player.

15. The neckstrap of claim 1 wherein said means for electronically connecting the audio signal source includes a switching mechanism that selectively connects the speaker assembly individually, the earphone individually, or both the speaker assembly and earphone simultaneously to the audio signal source.

* * * * *